United States Patent

[11] 3,593,000

| [72] | Inventor | Andre Forma<br>7, Rue Livrey, 92 Levallois-Perret, France |
|---|---|---|
| [21] | Appl. No. | 875,779 |
| [22] | Filed | Nov. 12, 1969 |
| [45] | Patented | July 13, 1971 |
| [32] | Priority | Nov. 15, 1968 |
| [33] | | France |
| [31] | | 17342.3 |

[54] APPARATUS FOR WELDING PLASTICS
10 Claims, 3 Drawing Figs.

[52] U.S. Cl................................................ 219/243,
219/538
[51] Int. Cl................................................. H05b 1/00
[50] Field of Search........................................ 219/243,
245, 254, 538, 552, 553; 53/39, 379; 156/498,
515, 583

[56] References Cited
UNITED STATES PATENTS
3,033,257    5/1962    Weber...................... 156/515 X

*Primary Examiner*—J. V. Truhe
*Assistant Examiner*—C. L. Albritton
*Attorney*—Norman S. Blodgett ABSTRACT: Apparatus for the welding of plastics, consisting of a pointed heating bar having faces which form an angle in the range from 15° to 35° with a plane passing through the apex and having faces adjacent the apex whose included angle is in the range from 80° to 110°.

PATENTED JUL 13 1971

3,593,000

INVENTOR.
ANDRE FORMA
BY
Norman S. Blodgett
ATTORNEY

APPARATUS FOR WELDING PLASTICS

BACKGROUND OF THE INVENTION

Welding is very commonly used at the present day in the processing of plastics materials; it is extremely useful when various articles are made from sheets of plastic material and, more particularly, it plays a considerable part in the field of wrapping in sheets of plastic material. In this latter application, the bar which effects the welding of two sheets to close the package serves, at the same time, to cut the sheets following the welding. These operation, however, involve certain difficulties with known devices: when the edge of the hot welding bar, which presses on the sheets to be welded, is flat and is of a certain width, the weld is effected in a suitable manner, but cutting is difficult, since it causes the plastics material to stick to the tool, even in the presence of the glass cloth, when this is used as an interposed material between the bar and the plastics material; on the other hand, if this edge is a cutting edge, cutting is easy, but welding is generally inadequate. These and other difficulties experienced with the prior art devices have been obviated in a novel manner by the present invention.

It is, therefore, an outstanding object of the invention to overcome or reduce the difficulties of the prior art by the use of a welding bar whose hot portion, which comes into contact with the materials to be welded, is given a special form which permits both the making of an excellent weld and also the cutting of the welded material along the middle of the weld.

Another object of the invention is to prevent the sticking of the plastics material to the tool bar or to the glass cloth which may be made of the material known under the registered trademark Teflon, which is often used as an interposed layer between the plastics material and the bar.

A further object of the invention is to cut plastics sheets by fusion while effecting a weld over a sufficient width on either side of the cutting line.

With these and other objects in view, as will be apparent to those skilled in the art, the invention resides in the combination of parts set forth in the specification and covered by the claims appended hereto.

SUMMARY OF THE INVENTION

In general, the invention has to do with apparatus for the welding and cutting of sheets of plastics material, which comprises a heating bar, the active portion of which has two faces which, in cross section, form angles of 15° to 35° with the horizontal and terminate, at their common apex, in a substantially triangular rib apex angle of which is 80° to 110°.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

The active portion of the bar, according to the invention, has, in cross section, a bevelled form whose faces form with the horizontal angles of 15° to 35° and terminate, at their common apex, in a substantially triangular rib whose apex angle is from 80° to 110°.

Preferably, the inclination of the bevelled faces, relatively to the horizontal working plane of the bar, is between 25° and 30° and, better still, it is between 26° and 27°.

The ribs which terminate the two bevelled faces and constitute the active edge of the device, preferably have an angle of 80° to 105° at the apex, or better still, an angle of 90° ± 5°. The edge of the rib may be slightly rounded.

By observing the aforesaid inclinations and shapes, it is found unexpectedly that the usual disadvantages mentioned hereinbefore no longer occur, or are at least reduced, and the simultaneous cutting and welding of plastics material are effected in a very regular manner. Thus, it is possible to weld and cut with the greatest ease films of polyvinyl chloride, polyethylene and other similar plastics materials.

Depending on the nature of the materials to be processed and their thickness, the dimensions in absolute value of the active portion of the bar may vary; in general, in present day operations involving wrapping in sheets of plastic material, good results are obtained with a rib the width and height of which are between 0.5 and 1.5 mm.; preferably, the width, that is to say, the base of the triangle which constitutes the rib, is substantially double the height.

Figure 1:
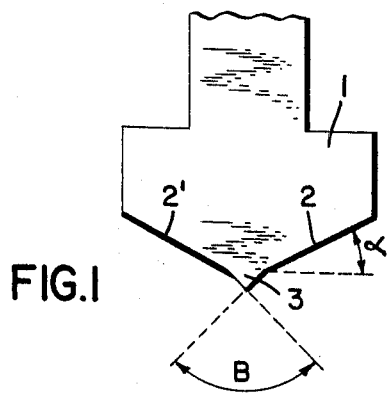
FIG. 1 is an end elevational view of apparatus embodying the principles of the present invention.

The body 1 of the bar shown in the drawings terminates with inclined symmetrical faces 2 and 2'; these two faces terminate in a common rib 3 which constitutes the active part of the assembly. It is this rib 3 which comes into contact with the sheet of plastic material which is to be welded and cut. In the preferred form of embodiment illustrated in FIGS. 1 and 2, the faces 2 and 2' are inclined relatively to the horizontal at angles $\alpha$ of 26° 30', while the angle at the apex $\beta$ of the rib 3 is 90°. The height of the triangle 3 is 0.5 mm. while the width of the rib, that is to say, the base of the triangle 3, is 1 mm. When the welding and cutting are effected by this rib 3, it is found that the sheet of plastic material is cut by fusion and the plastic material is forced away on either side of the rib to form a kind of bead, which ensures that the weld has a certain strength.

Figure 2:
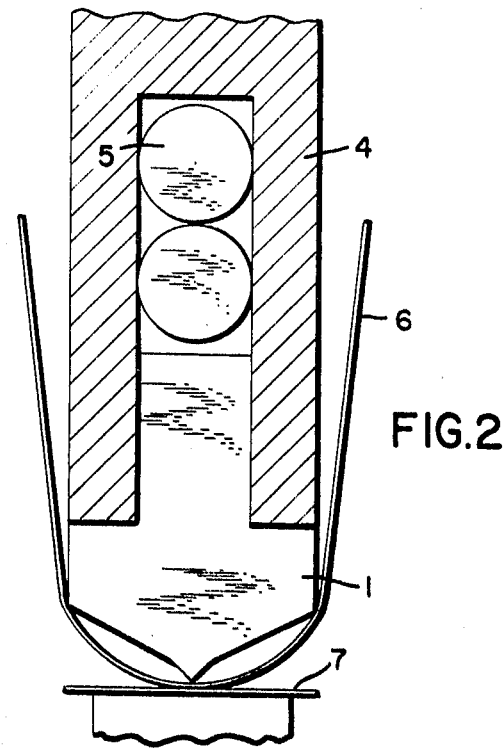
FIG. 2 is an elevational view showing the apparatus in use.

In FIG. 2, the reference 4 indicates a holder on which the body 1 is fixed; within this electrode holder there are placed heating resistances 5 in the immediate vicinity of the body 1, which they heat. In this same figure, there has also been shown diagrammatically a strip of glass cloth 6 which, during welding, is interposed between the rib 3 and the sheets 7 to be welded.

Figure 3:
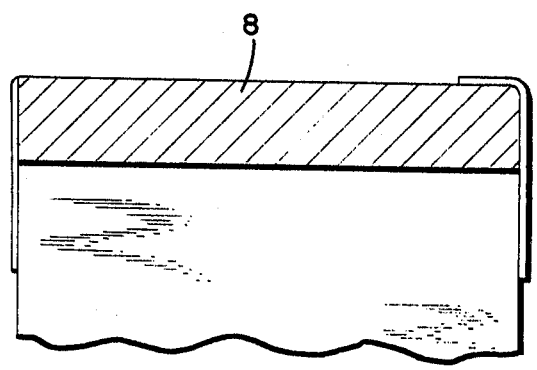
FIG. 3 shows the upper portion of the apparatus.

The top of the holder 4, which is partly shown in FIG. 3, is provided with a rubber lining 8, in the region where the control elements are fitted. This is a known arrangement details of which need not be described here.

EXAMPLES

Samples of a polyethylene sheet 0.5 mm. thick were subjected simultaneously to heat welding and cutting. Each welding was carried out on two superposed sheets and repeated 100 times. Cutting was performed along the middle line of each weld by the action of heat under the contact of the bar used. The quality of the welds and the cuts thus obtained was observed on each sample.

In example 1 the welding-cutting was made with an electrically heated wire of 1 mm. diameter in usual way.

In each of examples 2 to 12 the heated bar, in accordance with the invention, was used: the angles $\alpha$ and $\beta$ of the wedges varied as set forth in the following table.

All the operations of welding and cutting were carried out with the interposition of a glass-reinforced Teflon, and the temperature of welding was 230° C.

TABLE

| Example No. | α, degrees | β, degrees | Number of satisfactory welds |
| --- | --- | --- | --- |
| 1 |  | (¹) | 78 |
| 2 | 12 | 60 | 75 |
| 3 | 12 | 90 | 78 |
| 4 | 25 | 90 | 93 |
| 5 | 26 | 90 | 100 |
| 6 | 27 | 70 | 92 |
| 7 | 27 | 80 | 97 |
| 8 | 27 | 90 | 100 |
| 9 | 27 | 100 | 97 |
| 10 | 27 | 120 | 92 |
| 11 | 35 | 90 | 95 |
| 12 | 45 | 90 | 84 |

¹ Diameter 1 mm.

As seen, results considerably improved (100 percent good welds) over those of the prior art (example 1 : 78 percent) are obtained when $\alpha$ is 26° to 27° and $\beta$ as close as possible to 90°.

Similar results are found with plasticized polyvinylchloride and polypropylene sheets.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what I claim as new and desire to secure by Letters Patent is:

1. A device for the welding and cutting of sheets of plastic material, comprising
   a. a heating bar having two inclined faces which are symmetrical with an imaginary vertical plane, each face having a narrow rib surface part and a broad secondary surface part, the rib surface parts of the faces meeting at an angle in the range from 80° to 110° to form an apex angle lying in the said plane to form an operative edge, the secondary surface parts extending away from areas of their respective rib surface parts remote from the said apex and lying at angles to the horizontal in the range from 15° to 35°, and
   b. heating means in thermal communication with the heating bar.

2. A device according to claim 1, wherein the angle which the two secondary surface parts form with the horizontal is 25° to 30°.

3. A device according to claim 2, wherein the said angle is 26° to 27°.

4. A device according to claim 3, wherein the said apex angle of the rib surface parts is 85° to 105°.

5. A device according to claim 3, wherein the said apex angle is 90° ± 5°.

6. A device according to claim 1, wherein the width between the rib surface parts is substantially double the height.

7. A device according to claim 1, wherein the width and height of the rib surface parts are each from 0.5 to 1.5 mm.

8. A device according to claim 1, wherein the portion of the bar adjacent the said two faces is fixed in an electrode holder provided with the said heating means.

9. A device according to claim 8, wherein the said heating means comprise at least one electrical resistance which is accommodated within the electrode holder in the immediate vicinity of the said portion of the bar.

10. A device according to claim 9, wherein the portion of the electrode holder opposite said portion of the bar is provided with a rubber lining in the region where control elements of the device are fitted.